US010975922B2

(12) United States Patent
Hughes et al.

(10) Patent No.: US 10,975,922 B2
(45) Date of Patent: Apr. 13, 2021

(54) HYDRAULICALLY ACTUATED DIFFERENTIAL (71) Applicant: Eaton Intelligent Power Limited, Dublin (IE)

(72) Inventors: Douglas Anthony Hughes, Novi, MI (US); James Kevin Spring, Brighton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/339,690

(22) PCT Filed: Oct. 10, 2017

(86) PCT No.: PCT/US2017/055956
§ 371 (c)(1),
(2) Date: Apr. 4, 2019

(87) PCT Pub. No.: WO2018/068054
PCT Pub. Date: Apr. 12, 2018

(65) Prior Publication Data
US 2019/0285127 A1    Sep. 19, 2019

Related U.S. Application Data (60) Provisional application No. 62/405,565, filed on Oct. 7, 2016.

(51) Int. Cl.
*F16D 25/08*   (2006.01)
*F15B 1/26*   (2006.01)
(Continued)

(52) U.S. Cl.
CPC ............ *F16D 25/083* (2013.01); *F15B 1/265* (2013.01); *F15B 11/10* (2013.01); *F16D 13/52* (2013.01);
(Continued)

(58) Field of Classification Search
CPC ...... F16D 25/08; F16D 25/082; F16D 25/083; F16D 25/087; F16D 25/088; F16D 25/12;
(Continued)

(56) References Cited

U.S. PATENT DOCUMENTS 4,445,400 A * 5/1984 Sullivan ................ F16H 48/08
192/52.5
7,568,568 B2   8/2009 Porter et al.
(Continued)

FOREIGN PATENT DOCUMENTS

| CN | 103912678 B | 11/2016 |
| DE | 516334 C | 1/1931 |
| WO | 2015090310 A1 | 6/2015 |

OTHER PUBLICATIONS

International Search Report and Written Opinion dated Dec. 22, 2017 for PCT/US2017/055956; pp. 1-11.

*Primary Examiner* — David R Morris
(74) *Attorney, Agent, or Firm* — Mei & Mark, LLP (57) ABSTRACT A hydraulically-actuated device comprises a self-contained fluid reservoir comprising a tank for receiving a fluid, a reservoir port, and a flexible diaphragm. An actuation member comprises a hydraulically actuated piston in a cylinder. A pump case comprises an inlet port and an outlet port, the inlet port in fluid communication with the reservoir port, and the outlet port in fluid communication with the actuation member. A pump is within the pump case. The pump can be a reversible pump. The flexible diaphragm can flex in to the fluid reservoir when the pump transfers a fluid from the fluid reservoir to the actuation member and can flex away from the fluid reservoir when the pump transfers fluid from the actuation member to the fluid reservoir. The flexible diaphragm can hermetically seal a fluid within the fluid reservoir and have a second side in communication with atmospheric pressure.

20 Claims, 8 Drawing Sheets (51) Int. Cl.
*F15B 11/10* (2006.01)
*F16D 13/52* (2006.01)
*F16H 48/22* (2006.01)
*F16H 48/32* (2012.01)
*F16D 48/02* (2006.01)

(52) U.S. Cl.
CPC ............. *F16D 25/14* (2013.01); *F16H 48/22* (2013.01); *F16H 48/32* (2013.01); *F15B 2211/20515* (2013.01); *F15B 2211/20561* (2013.01); *F15B 2211/7051* (2013.01)

(58) Field of Classification Search
CPC .......... F16D 25/14; F16H 48/20; F16H 48/22; F16H 48/27; F16H 48/30; F16H 48/32; F16H 5611/08; F16H 48/10; F15B 11/08; F15B 11/10; F15B 1/26; F15B 1/265; F15B 2211/20515; F15B 2211/212; F15B 2211/528; F15B 2211/20538; F15B 2211/20561; F15B 2211/7051; F15B 2211/7052

See application file for complete search history.

(56) References Cited

U.S. PATENT DOCUMENTS

| | | |
|---|---|---|
| 7,878,933 B2 | 1/2011 | Porter et al. |
| 8,545,367 B2 | 10/2013 | Hartz et al. |
| 9,358,866 B2 | 6/2016 | Hartz et al. |
| 9,410,562 B2 | 8/2016 | Besemer et al. |
| 10,066,677 B2 | 9/2018 | Baehr et al. |
| 2007/0056822 A1 | 3/2007 | Porter et al. |
| 2009/0258751 A1 | 10/2009 | Porter et al. |
| 2012/0258838 A1 | 10/2012 | Hartz et al. |
| 2014/0080664 A1 | 3/2014 | Hartz et al. |
| 2015/0377260 A1 | 12/2015 | Besemer et al. |
| 2016/0084365 A1 | 3/2016 | Besemer et al. |
| 2016/0230817 A1 | 8/2016 | Kleinhardt et al. |
| 2016/0244053 A1 | 8/2016 | Hartz et al. |
| 2017/0002874 A1 | 1/2017 | Baehr et al. |

* cited by examiner

HYDRAULICALLY ACTUATED DIFFERENTIAL

This is a § 371 National Stage Entry of Patent Cooperation Treaty Application No. PCT/US2017/055956, filed Oct. 10, 2017, and claims the benefit of U.S. provisional application No. 62/405,565, filed Oct. 7, 2016, which are incorporated herein by reference.

FIELD

This application provides a hydraulically actuated differential with a self-contained actuation fluid reservoir and a flow circuit therefor that minimizes flow restrictions.

BACKGROUND

Prior hydraulic circuits for differentials comprise an external fluid supply which increases cost and complexity as supply cables and connections are added. Or, when an internal fluid supply is used, it is collected via a leakdown or drainage approach that uses the same fluids for clutch actuation and lubrication, and the fluid cross-contaminates and must still be routed.

Routing fluid can result in hydraulically actuated differentials suffering from unnecessary flow restrictions due to the integration of a hydraulic port on the differential case. And, in order to connect to the hydraulic line, inefficient porting can occur, increasing flow losses and increasing load on the device.

SUMMARY

The methods and devices disclosed herein overcome the above disadvantages and improves the art by way of a hydraulically-actuated device comprising a self-contained fluid reservoir comprising a tank for receiving a fluid, a reservoir port, and a flexible diaphragm. An actuation member comprises a hydraulically actuated piston in a cylinder. A pump case comprises an inlet port and an outlet port, the inlet port in fluid communication with the reservoir port, and the outlet port in fluid communication with the actuation member. A pump is within the pump case. The pump can be a reversible pump. The flexible diaphragm can flex in to the fluid reservoir when the pump transfers a fluid from the fluid reservoir to the actuation member and can flex away from the fluid reservoir when the pump transfers fluid from the actuation member to the fluid reservoir. The flexible diaphragm can hermetically seal a fluid within the fluid reservoir and have a second side in communication with atmospheric pressure.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Proposed are different arrangements by which a hydraulic pump 700 may be integrated with a controllable differential (for example, the Eaton Corporation eLSD (electronic limited slip differential) and variants thereof) in ways that tend to minimize flow restrictions. The disclosed concepts can also be applied more generally to any application where minimization of flow losses is important and packaging flexibility supports the close integration of the pump 700 and the hydraulic load.

For example, an eLSD can comprise clutch 500 as an actuation member. Actuation member, or clutch 500, can comprise a hydraulically actuated piston 502 in a cylinder 501. The actuation member can be configured to actuate a differential for a vehicle driveline as by comprising a clutch pack 509 compressible by the piston 502. Clutch can comprise a limited slip clutch pack 509. Clutch pack 509 can comprise interleaved plates coupled to each of a torque coupler 5012 and a torque connection 5011 so that when reaction block 507 or other transfer mechanism is pressed by piston 502, the clutch pack 509 engages. Pump 700 can actuate piston 502 in cylinder 501 in clutch housing 503. When fluid pressure is supplied to the cylinder 501, the piston 502 compresses springs 505 and pushes reaction block 507. With the clutch pack 509 engaged, torque from an axle, transferred to torque coupler 5012 via axle couplings 5013, can be transferred to torque connection 5011. When pump 700 withdraws fluid from cylinder 501 to return the fluid to the fluid reservoir 100, the springs 505 can push the reaction block 507 away from the clutch pack 509 and the plates can disengage. The fluid pressure supplied by the clutch can control the slip of the clutch pack 509. Other aspects of the differential, and alternative clutch arrangements, can be substituted within the scope of the disclosure.

A hydraulically-actuated device, such as clutch 500, can comprise a self-contained fluid reservoir 100 comprising a tank 101 for receiving a fluid. A reservoir port 103 can be included for communicating the fluid in and out of the tank 101.

Figure 1:
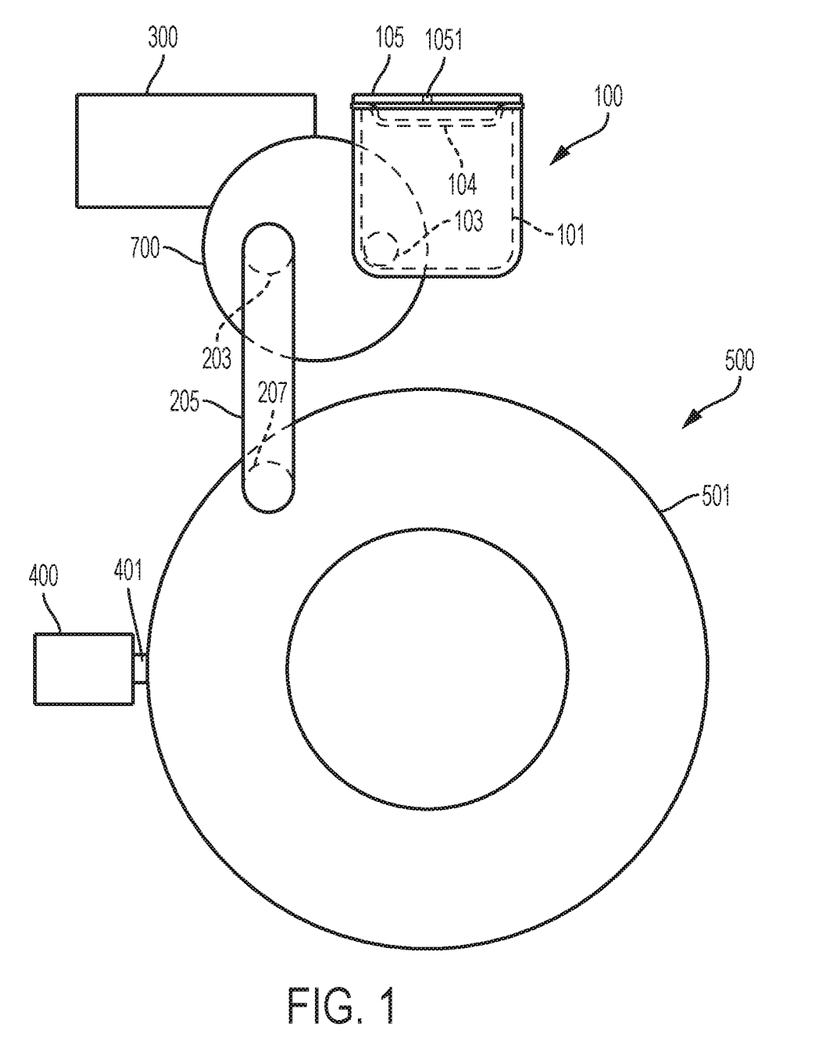
FIG. 1 is a schematic view of an actuation member integrated with self-contained fluid reservoir.
Figure 2:
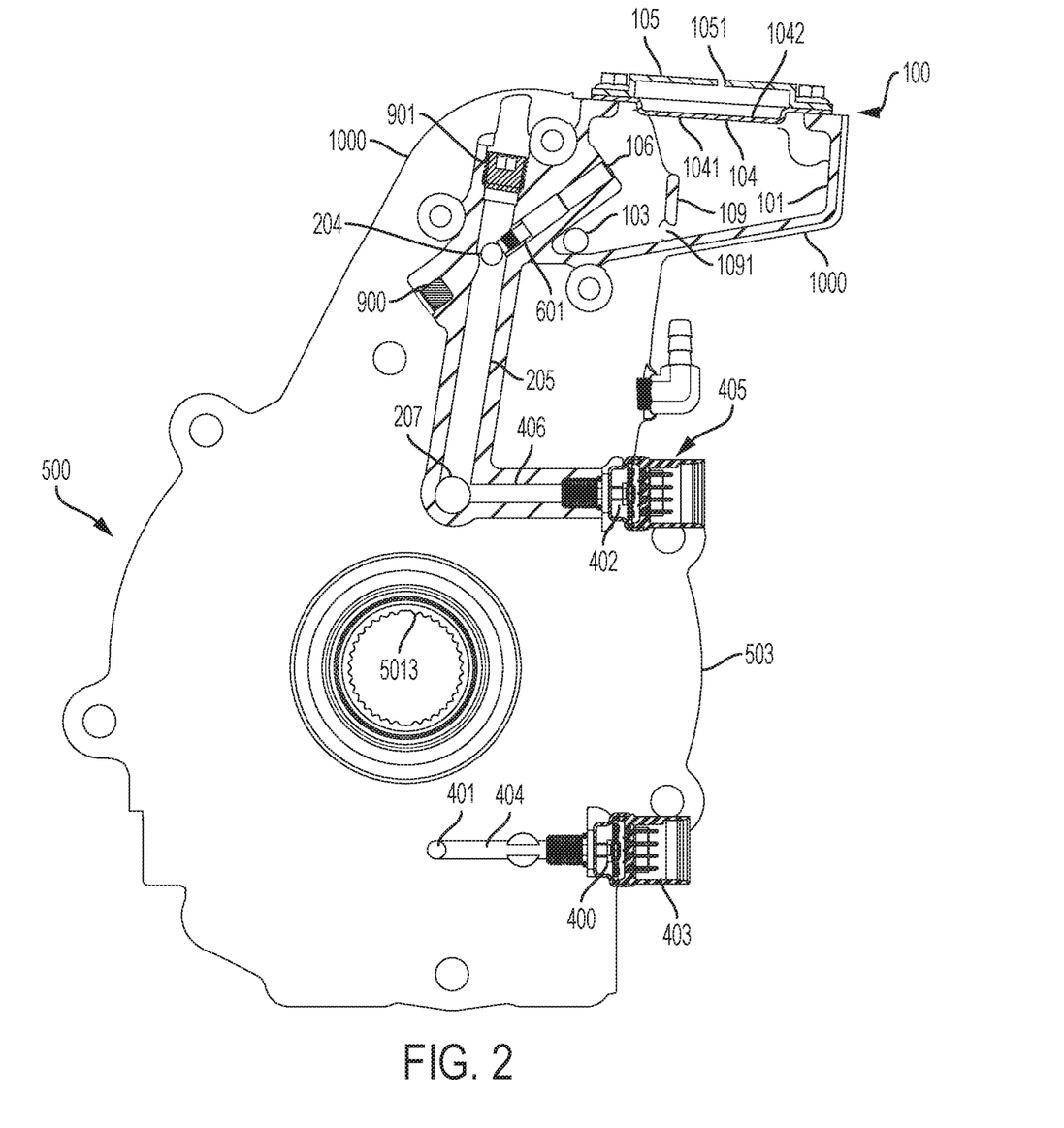
FIG. 2 is a cross-section view of an actuation member integrated with self-contained fluid reservoir.
Figure 3:
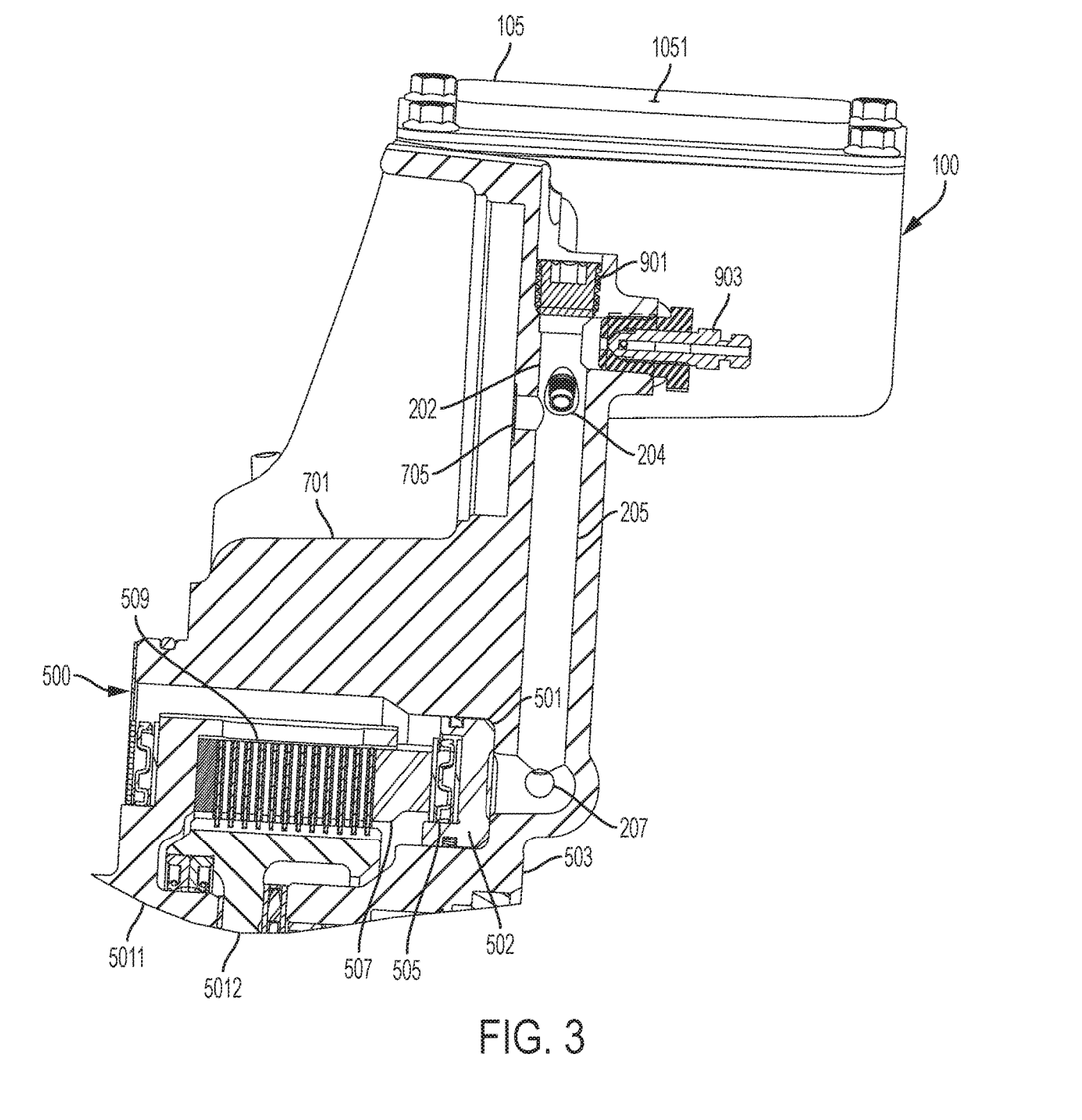
FIG. 3 is an alternative cross-section view of an actuation member integrated with self-contained fluid reservoir.
Figure 4:
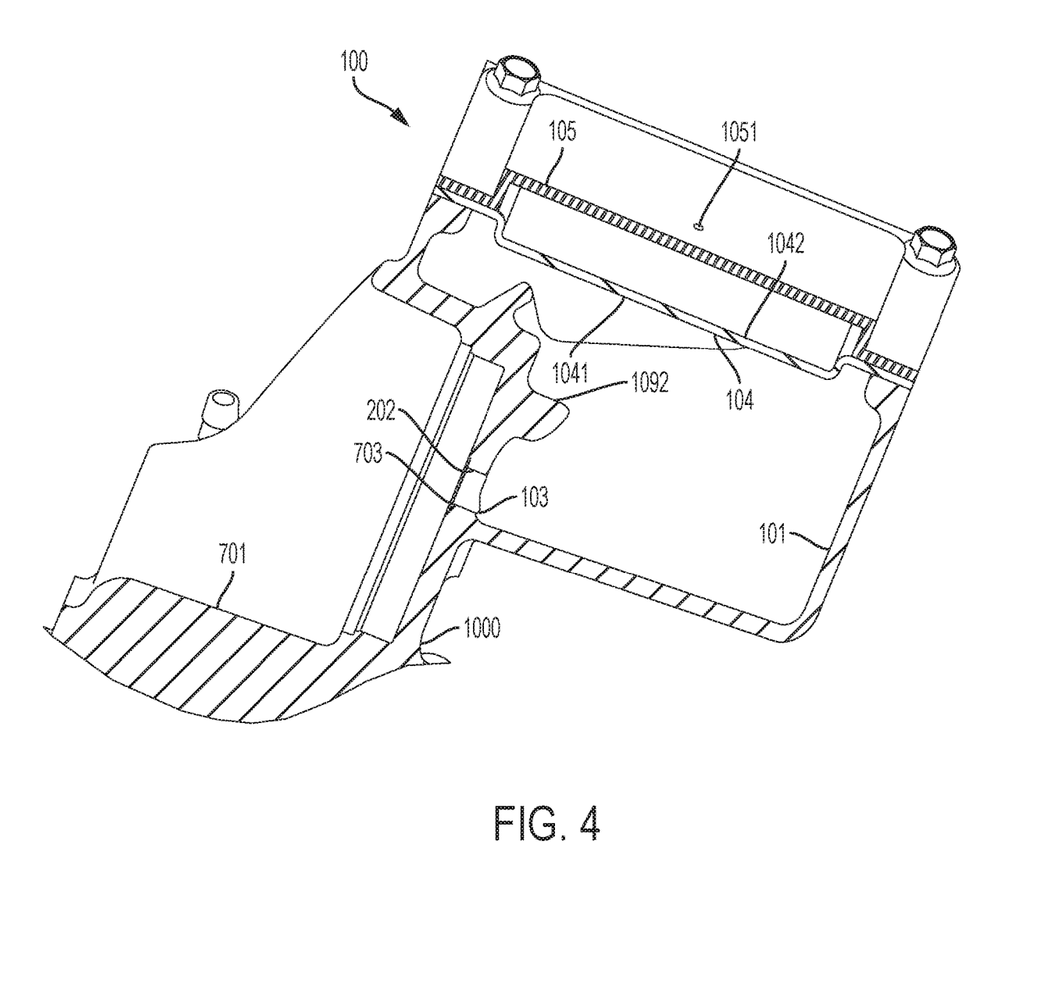
FIG. 4 is a cross-section view of a self-contained fluid reservoir.

A flexible diaphragm 104 can be included for expanding when the tank 101 is filling and for contracting when the tank 101 is emptying. The flexible diaphragm can be a cup-shape or other shape, such as a stamped sheet. Flexible diaphragm 104 comprises a first side 1041 configured to hermetically seal a fluid within the tank 101 of fluid reservoir 100 and a second side 1042 in communication with atmospheric pressure. A cap 105 or other lid, brace, gasket or the like can secure the flexible diaphragm 104 to the housing 1000. One or more fasteners, such as screws or rivets can also be included. Cap 105 comprises a vent 1051 to permit atmospheric pressure on the second side 1042 of the flexible diaphragm. The flexible diaphragm 104 can be configured to flex in to the fluid reservoir (downward in FIG. 2) when the pump transfers a fluid from the fluid reservoir to the actuation member, and can be configured to flex away from the fluid reservoir (upward in FIG. 2) when the pump 700 transfers fluid from the actuation member to the fluid reservoir 100. The flexible diaphragm can also flex away from the fluid reservoir during prefilling or during overpressure relief.

Figure 6:
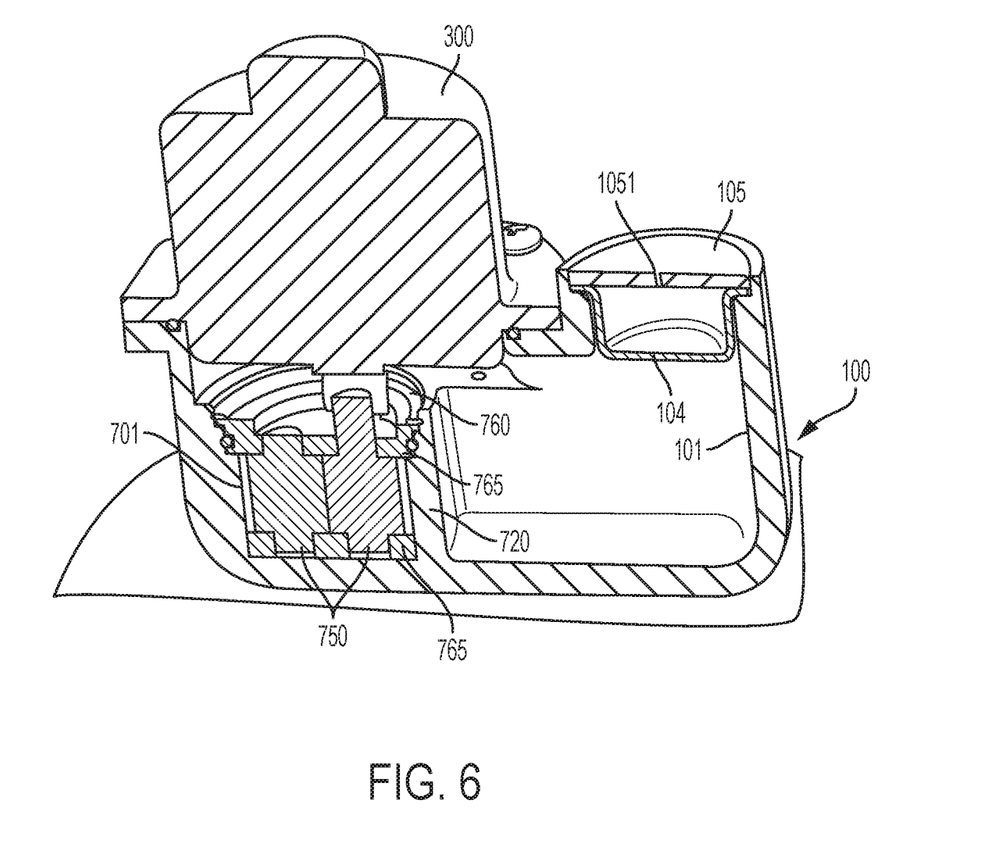
FIG. 6 is a view of an alternative fluid reservoir integrated with a pump and actuation member housing.

In FIG. 6, flexible diaphragm 104 can be a cup-shaped flexible rubber diaphragm that partitions the fluid in the fluid reservoir 100 from the atmosphere (ATM). A vent 1051 can be an orifice that vents the interior of the cup to the atmosphere. The cup can collapse towards the orifice when fluid pressure in the fluid reservoir is high. However, when the fluid is pumped in to the actuation member, such as a differential, to actuate the hydraulic piston 502, the cup can elastomerically expand to avoid a vacuum in the fluid reservoir 100. The fluid reservoir can eliminate the need to connect to an hydraulic circuit.

Fluid reservoir can be a self-contained hydraulic sump. "Self-contained" can be described as an isolated compartment, accessible only via reservoir port 103 or relief port 106, that can be serviceable during repair periods or fillable during assembly, but that is otherwise cut off from an outside supply of hydraulic fluid during active periods. Self-contained can also mean that the tank 101 of the fluid reservoir can only be filled through its connection to pump 700. Then, a self-contained hydraulically-actuated device can comprise the fluid reservoir 100 connected via the pump 700 to the cylinder 501 and piston 502, with no other sources of fluids therebetween.

The tank 101 can comprise a baffle 109. An additional hole 1091 can be in the baffle 109 to provide fluid flow from one side of the baffle 109 to the other. The baffle 109 helps ensure that the reservoir port 103 receives fluid so that the pump inlet 201 stays flooded even if the fluid level gets low and the vehicle is moving around a lot. Additional ribs 1092 can be included for providing structural integrity.

In some cases, a relief passage 601 can be included, in fluid communication with a relief port 106 in the tank 101, so that a one-way valve or other check valve can permit overpressure to return to the tank from the actuation member 500. For example, if the pump 700 pumps too much fluid to the cylinder 501, excess fluid can return to the tank 101 as by setting a fluid pressure point on the one-way valve. Relief passage 601 can be drilled in to housing 1000 and a plug 900 can seal the drilled passage.

A pump case 701 can be integrally formed with the housing 1000 for receiving there within a drop-in pump 700. This eliminates leakage and improves performance. Alternatively, the entire pump 700 can be integrated with the housing 1000 via an integrative manufacturing technique. The pump 700 can be a reversible pump actuated by a motor 300. Pump case 701 can comprise an inlet port 703 and an outlet port 705. The inlet port 703 can be in fluid communication with the reservoir port 103 via a drilled passage 202 or can be in direct fluid communication. Outlet port 705 can be in fluid communication with the actuation member, clutch 500, as by a passages 202, 207, 207. Seals can also be provided for, as appropriate between the pump 700 and the pump case 701.

The outlet port 705 can directly couple to the cylinder 501 via passage 205, with no intervening valves, accumulators, solenoids or other flow-restricting devices. The pump 700 can be a reversible pump configured to transfer a fluid from the fluid reservoir 100 to the actuation member (clutch 500), and from the actuation member to the fluid reservoir.

Housing 1000 can surround the actuation member and the self-contained fluid reservoir 100. The tank 101, the reservoir port 103, and the cylinder 501 can be integrally formed with the housing 1000. At least passages 202, 205, 207 can also be integrally formed, as by cross-drilling. Plugs 901 and air bleeders 903 can be included as appropriate.

FIGS. 5-8B provide alternative pump arrangements. Pump 700 can comprise a pair of rotating gears, and the pump cases can be configured to facilitate an assembly method comprising a drop-in assembly method for the pair of rotating gears.

Figure 5:
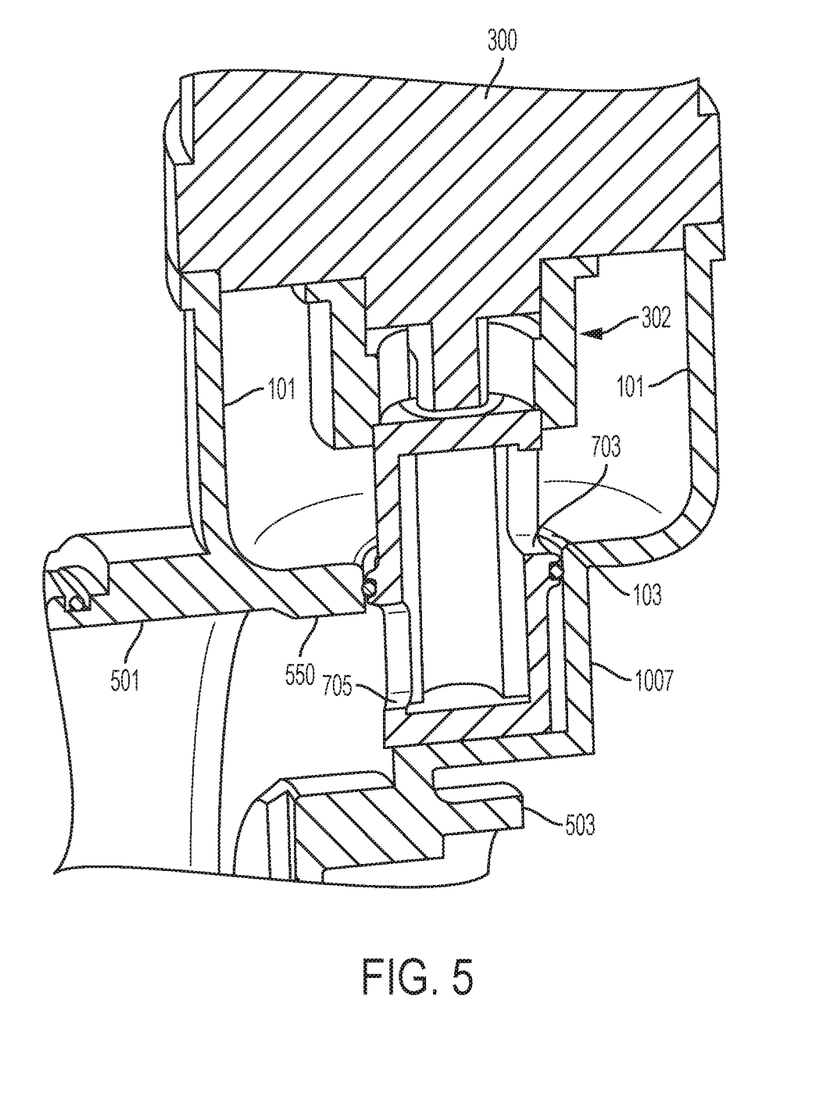
FIG. 5 is a view of an alternative fluid reservoir integrated with a pump and actuation member housing comprising a drop in pump comprising axially and radially offset inlet port and outlet port.

In FIG. 5, housing 1000 is integrally formed with the cylinder 501. A small fluid reservoir 550 can intervene between cylinder 501 and pump outlet 705. But, no other valves or flow restrictions intervene between the cylinder 501 and pump 700, permitting a direct coupling of the pump 700 to the cylinder 501. Housing 1000 is also integrally formed with a pump case in the form of a neck 1007 to surround the outlet port 705. Tank 101 remains integrally formed with housing 1000.

Motor 300 can be connected to pump 700 via a motor connection point 302 so that the pump 700 can be dropped in and the motor can be drop-in assembled next. Or, the motor 300 can be integrated to the pump 700 prior to dropping-in the pump 700. So, the inlet port 703 of the pump 700 is modularly affixed to the housing 1000 when the pump 700 is drop-in assembled to the housing 1000. The pump 700 and the pump case comprise a long axis, and the inlet port 703 is radially and axially offset from the outlet port 705 on the long axis of the pump case. Neck 1007 can connect to the reservoir port 103.

Pump 700, such as a gear pump, thus comprises a segmented housing that provides axial separation of the inlet port 703 and outlet port 705. The inlet port 703 can be immersed in the fluid reservoir 100 and the outlet port 705 can discharge directly into the actuation member comprising a hydraulic cylinder 501 and piston assembly 502. This arrangement eliminates many drilled fluid passages.

Figure 7:
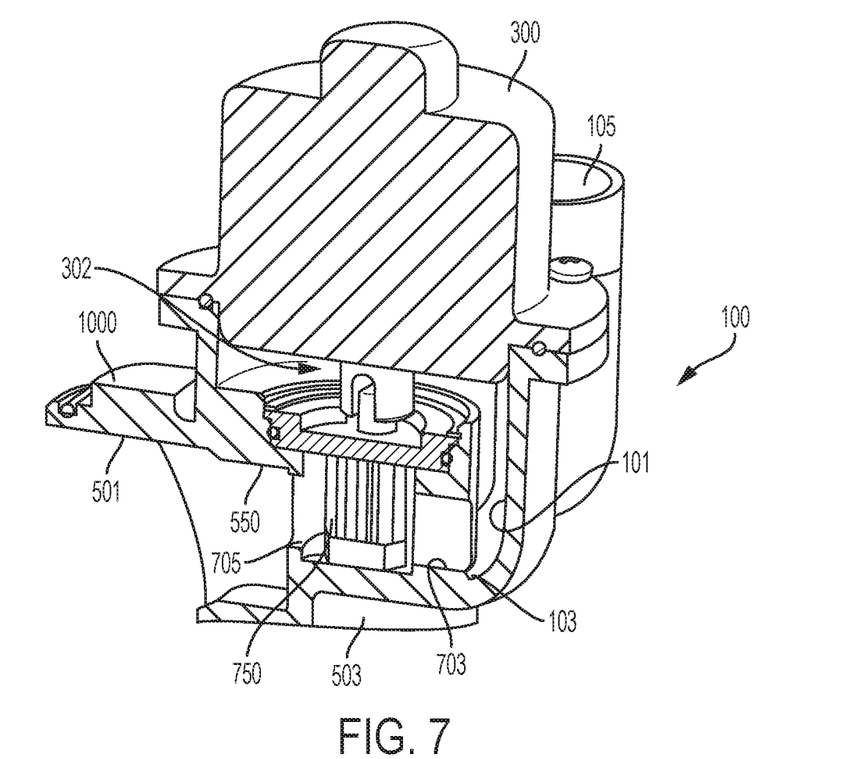
FIG. 7 is a view of an alternative fluid reservoir integrated with a pump and actuation member housing comprising a drop in pump comprising axially in-line and radially offset inlet port and outlet port.

In FIGS. 6 & 7, the gears 750 of the gear pump can be dropped-in to the pump case 701. Then, the pump case 701 can share a wall 720 with the fluid reservoir 100. The housing 1000 comprises the integral formation of a fluid reservoir 101, pump case 701 and actuation member housing 503. The rotating pump set does not have a dedicated housing and it can assemble directly into the housing 1000. The pump case of FIG. 6 is no longer a loose piece, but is integrally formed with the housing 1000. The housing 1000 is machined with features that replicate the functions of the pump case. The inlet and outlet ports are arranged for minimum flow restriction. The gears 750 can be dropped in to the machined pump case, and then a snap ring 760 can be used with gear stabilizers 765 to secure the gears 750 with respect to the machined pump case. Machining can be replaced with molding or printing.

Figure 8A:
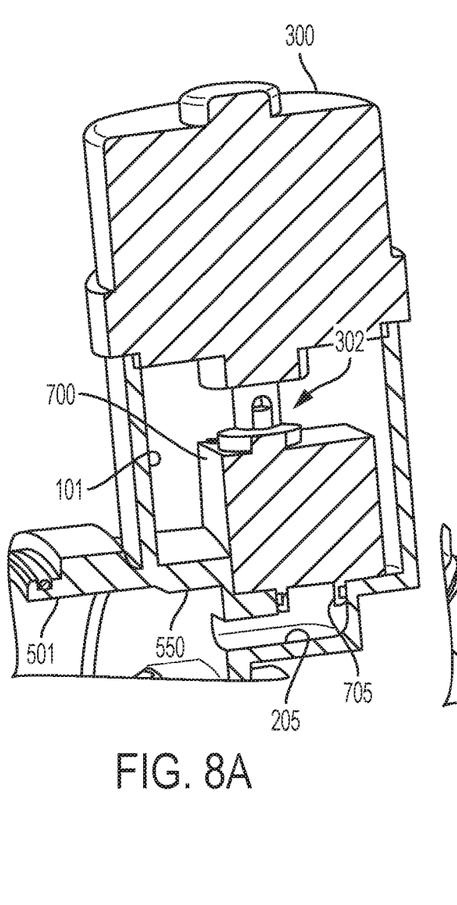
FIGS. 8A & 8B are views comprising a modular pump comprising axially in-line inlet port and outlet port and an alternative fluid reservoir integrated with a pump case and actuation member housing.

The vertically offset inlet and outlet ports of FIG. 5 could be used with the drop-in options of FIG. 6, but FIG. 7 shows an alternative port arrangement. In FIG. 7, short, but large diameter inlet and outlet ports 703, 705 are substantially in-line, and not vertically offset. The inlet and outlet ports are radially offset, but axially aligned on the long axis of the pump case. This limits flow restrictions across the gears. FIG. 8 shows an alternative cross-section of the pump case area of the differential housing, illustrating the integrated nature of the pump case, such that the pump case shares walls of the differential housing.

Figure 8B:
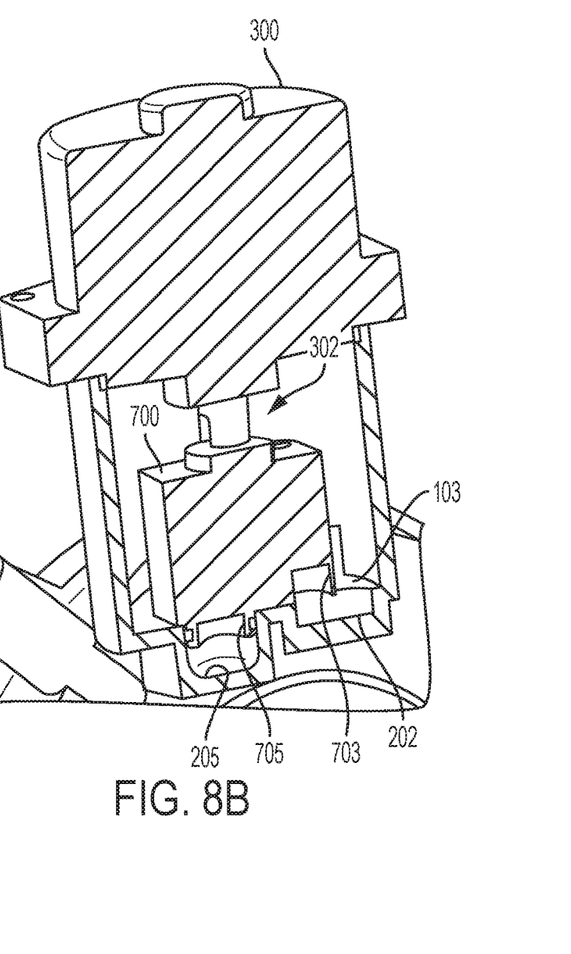

Another concept shows a pump 700 with axial flow ports that assembles by interfacing with inlet port 103 and outlet port 705 features formed in the housing 1000. In FIGS. 8A & 8B, the fluid flow path of the pump 700 comprises a radially separate but axially in-line inlet port 703 and outlet port 705. The pump 700 comprises a long axis, and the inlet port 703 is radially offset from the outlet port 705, but the inlet port 703 is axially aligned with the outlet port 705 on the long axis of the pump. Although this concept has 90-degree bends in the ports which would tend to reduce flow efficiency as compared to the other concepts, it features a pump housing designed for axial-inlet, axial-outlet flow patterns.

In FIGS. 8A & 8B, the hydraulic pump 700 is modular and comprises a plug and socket arrangement. A pump case can be formed as by providing the socket for the outlet port 705 to plug in to passageway 205 of housing 1000. And, motor 300 can be mounted to the modular hydraulic pump 700. It is possible in this arrangement that the inlet port 703 can be sized smaller than the outlet port 705.

The disclosed alternatives provide easy integration of a fluid pump 700 with a differential housing 1000. The alternatives minimize flow paths, bends, and flow restrictions. The disclosure enhances operation of an actuation member, such as a piston 502 within a differential housing 1000. For example, running the gears 750 of the gear pump in a first direction causes fluid to flow from the fluid reservoir 100 to the cylinder 501. Fluid pressure from the pump then activates a piston 502 to press on, for example, a limited slip clutch pack 509. Running the gears 750 in reverse draws fluid away from the clutch pack 509 and retracts the piston 502. Fluid flows from within the cylinder 501 back to the fluid reservoir 100 without leaving the housing 1000.

A method for detecting clutch actuation pressure can comprise providing an actuation member comprising a hydraulically actuated piston 502 in a cylinder 501. A pump case 701 can be provided, the pump case comprising an inlet port 703 and an outlet port 705, the inlet port 703 in fluid communication with a reservoir port 103 of a self-contained fluid reservoir 100, and the outlet port 705 in fluid communication with the actuation member. Sensing a fluid pressure of a fluid pumping in to the cylinder 501 from the pump case 701 can be by way of a sensor 400 direct-coupled to the cylinder 501.

At least one pressure sensor 400 is coupled directly to the cylinder 501. A plug 403 can connect to, for example, a computer such as an electronic control unit (ECU) or other device. The sensor 400 can couple via a drilled passage 404 in the housing 1000 to a sensor port 401. Sensor port directly couples to the cylinder 501. Sensing pressure directly in the cylinder 501 is advantageous from a feedback control perspective because cylinder pressure is more closely associated with clutch application force. The pressure sensor 400 is configured to measure fluid pressure in the cylinder 501, the fluid pressure for pressing the piston 502 towards the clutch pack 509. A second pressure sensor 402 can be coupled between the outlet port 705 and the actuation member. Fluid pressure at the pump outlet can then be detected in addition to the direct cylinder pressure measurement. Second pressure sensor 402 can likewise comprise a plug 405 for connection to ECU and a passage 406 in the housing 1000.

Further benefits can inure by implementing a fluid isolation technique, whereby the piston separates the actuation fluid flowing from the fluid reservoir from the fluid lubricating the clutch pack. Then, separate fluids with advantageous properties can be used for their intended purpose, and the same fluid need not be used for both cylinder pressure and clutch lubrication. Likewise, the clutch fluid can be isolated from the differential.

Additional aspects can be explained when the piston isolates the actuation fluid from the remainder of the clutch, and when the self-contained fluid reservoir is used. The direct-coupling of the sensor is enabled. There are no hydraulic circuit supply cables and other connections to interfere with the sensor. And, because no internal fluid supply is used, there is no interference with the accuracy of the sensor via a leakdown or drainage approach that uses the same fluids for clutch actuation and lubrication. So, the self-contained fluid reservoir permits detection methods that are not possible with other hydraulic circuits.

The disclosure is not limited to differentials. Other hydraulically-actuated devices can benefit from the teachings. For example, another device comprising an actuatable piston, such as a clutch, can benefit from the disclosure.

Other implementations will be apparent to those skilled in the art from consideration of the specification and practice of the examples disclosed herein.

What is claimed is:

1. A hydraulically-actuated device, comprising:
   a self-contained fluid reservoir comprising a tank for receiving a fluid, a single reservoir port for communicating the fluid, and a flexible diaphragm in a relief port;
   an actuation member comprising a hydraulically actuated piston in a cylinder;
   a pump case comprising an inlet port and an outlet port, the inlet port in reversible fluid communication with the reservoir port, and the outlet port in reversible fluid communication with the actuation member; and
   a reversible pump within the pump case, the reversible pump configured to transfer fluid between the inlet port and the outlet port to transfer the fluid from the fluid reservoir to the actuation member, and from the actuation member to the fluid reservoir.

2. The device of claim 1, wherein the pump is a reversible pump is configured to transfer a fluid from the fluid reservoir to the actuation member via an actuation passage, and from the actuation member via the actuation passage to the fluid reservoir.

3. The device of claim 2, wherein the flexible diaphragm is configured to flex in to the fluid reservoir when the reversible pump transfers a fluid from the fluid reservoir to the actuation member, and wherein the flexible diaphragm is configured to flex away from the fluid reservoir when the reversible pump transfers fluid from the actuation member to the fluid reservoir.

4. The device of claim 1, wherein the flexible diaphragm comprises a first side configured to hermetically seal a fluid within the fluid reservoir and a second side in communication with atmospheric pressure.

5. The device of claim 1, further comprising a housing surrounding the actuation member and the self-contained fluid reservoir, wherein the tank, the reservoir port, and the cylinder are integrally formed with the housing.

6. The device of claim 5, wherein the pump case is integrally formed with the housing.

7. The device of claim 6, wherein the reversible pump comprises a pair of rotating gears, and wherein the pump case is configured to facilitate an assembly method comprising a drop-in assembly method for the pair of rotating gears.

8. The device of claim 1, further comprising a housing integrally formed with the cylinder, the outlet port, and the tank, wherein the inlet port is modularly affixed to the housing via the reversible pump.

9. The device of claim 1, wherein the pump case comprises a long axis, and wherein the inlet port is radially and axially offset from the outlet port on the long axis of the pump case.

10. The device of claim 1, wherein the reversible pump comprises a long axis, and wherein the inlet port is radially offset from the outlet port, and wherein the inlet port is axially aligned with the outlet port on the long axis of the pump.

11. The device of claim 1, wherein the outlet port directly couples to the cylinder.

12. The device of claim 1, further comprising a pressure sensor coupled directly to the cylinder.

13. The device of claim 12, wherein the actuation member further comprises a clutch pack compressible by the piston, and wherein the pressure sensor is configured to measure fluid pressure in the cylinder for pressing the piston in to the clutch pack.

14. The device of claim 12, further comprising a second pressure sensor coupled between the outlet port and the actuation member.

15. The device of claim 13, wherein the actuation member is configured to actuate a differential for a vehicle driveline.

16. A method for detecting clutch actuation pressure, comprising:
providing an actuation member comprising a hydraulically actuated piston in a cylinder;
providing a reversible pump in a pump case comprising an inlet port and an outlet port, the inlet port in reversible fluid communication with a reservoir port of a self-contained fluid reservoir, and the outlet port in reversible fluid communication with the actuation member via an actuation passage; and
sensing a fluid pressure of a fluid pumping into the cylinder from the pump case by way of a sensor direct-coupled to the cylinder.

17. The method of claim 16, further comprising sensing pump outlet fluid pressure by way of a sensor coupled between the outlet port and the actuation member.

18. A housing for a hydraulically-actuated device, consisting of:
a self-contained fluid reservoir comprising a tank for receiving a fluid, a single reservoir port for communicating the fluid, and a flexible diaphragm in a relief port;
a cylinder configured for housing a hydraulically actuated piston;
an actuation passage extending from the cylinder;
a pump passage extending from the reservoir port;
a pump case comprising an inlet port and an outlet port, the inlet port in fluid communication with the reservoir port via the pump passage, and the outlet port in fluid communication with the cylinder via the actuation passage; and
at least one sensor port configured to directly couple a pressure sensor to the cylinder.

19. A housing for fluidly isolating a hydraulically-actuated device, consisting of:
a self-contained fluid reservoir comprising a tank for receiving a fluid, a single reservoir port for communicating the fluid, and a flexible diaphragm in a relief port;
a cylinder housing a hydraulically actuated piston such that the fluid does not leak out of the cylinder past the hydraulically actuated piston;
an actuation passage extending from the cylinder;
a pump passage extending from the reservoir port;
a pump case comprising an inlet port and an outlet port, the inlet port in fluid communication with the reservoir port via the pump passage, and the outlet port in fluid communication with the cylinder via the actuation passage;
a pump in the pump case;
a motor connected to the pump; and
at least one pressure sensor directly coupled to the cylinder to sense fluid pressure.

20. A hydraulically-actuated device, comprising:
a self-contained fluid reservoir comprising a tank for receiving a fluid, a single reservoir port for communicating the fluid, and a flexible diaphragm in a relief port;
an actuation member comprising a hydraulically actuated piston in a cylinder;
a pressure sensor coupled directly to the cylinder;
a pump case comprising an inlet port and an outlet port, the inlet port in fluid communication with the reservoir port, and the outlet port in fluid communication with the actuation member;
a second pressure sensor coupled between the outlet port and the actuation member; and
a pump within the pump case.

* * * * *